United States Patent
Preiss et al.

(10) Patent No.: US 7,277,696 B2
(45) Date of Patent: Oct. 2, 2007

(54) SYSTEM AND METHOD FOR MINIMISING BANDWIDTH UTILISATION IN A WIRELESS INTERACTIVE VOICE RESPONSE SYSTEM

(75) Inventors: Bruno Richard Preiss, Waterloo (CA); Daniel Wilk, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 64 days.

(21) Appl. No.: 10/475,673

(22) PCT Filed: Apr. 17, 2002

(86) PCT No.: PCT/CA02/00531

§ 371 (c)(1),
(2), (4) Date: Apr. 30, 2004

(87) PCT Pub. No.: WO02/087098

PCT Pub. Date: Oct. 31, 2002

(65) Prior Publication Data

US 2004/0185835 A1    Sep. 23, 2004

(30) Foreign Application Priority Data

Apr. 23, 2001    (CA) .................................... 2344904

(51) Int. Cl.
*H04M 3/42* (2006.01)
*H04M 1/725* (2006.01)
*H04Q 7/38* (2006.01)
*G10L 11/00* (2006.01)
*G10L 21/00* (2006.01)

(52) U.S. Cl. .................. 455/414.4; 455/72; 379/88.18; 370/352; 370/353; 704/270; 704/270.1

(58) Field of Classification Search ............. 455/414.4, 455/72; 379/88.18; 370/352, 353, 354; 705/270, 270.1; 704/270, 270.1
See application file for complete search history.

(56) References Cited

U.S. PATENT DOCUMENTS 5,241,689 A    8/1993    Schwed ...................... 455/517

(Continued)

FOREIGN PATENT DOCUMENTS

WO    WO9812883    3/1998

OTHER PUBLICATIONS

International Search Report issued in PCT/CA02/00531, dated Aug. 26, 2002.

*Primary Examiner*—William Trost
*Assistant Examiner*—Ariel Balaoing
(74) *Attorney, Agent, or Firm*—Katten Muchin Rosenman LLP

(57) ABSTRACT

The present invention provides a novel system, method and apparatus of delivering interactive voice response services in a more efficient manner over a network. The system provides for the placement of a subscriber station local 28 to the subscriber and a gateway protocol converter at the base station 40. The gateway protocol converter converts bandwidth-intensive audio messages into compact data messages, which upon transmission to the subscriber station 28 are converted back into audio messages. By using data messages instead of audio messages over the network, bandwidth is saved on the network for other traffic. Another embodiment of the invention provides a method for transmitting subscriber responses utilizing the system. In another embodiment of the invention, there is provided an IVR system that utilizes the VoiceXML standard, or the like, whereby the Document Server, VoiceXML Interpreter Context, and the Implementation Platform are distributed at various locations along the communication link between the IVR service provider and the subscriber station—such components being distributed along the link according to a desired utilization of network resources, such as bandwidth.

12 Claims, 7 Drawing Sheets

U.S. PATENT DOCUMENTS

| | | | |
|---|---|---|---|
| 5,390,240 A * | 2/1995 | Sensney | 379/93.14 |
| 5,699,404 A | 12/1997 | Satyamurti | 340/7.28 |
| 5,848,098 A | 12/1998 | Cheng et al. | 375/220 |
| 5,881,104 A | 3/1999 | Akahane | 375/240 |
| 6,215,992 B1 * | 4/2001 | Howell et al. | 455/412.1 |
| 6,654,598 B1 * | 11/2003 | Son | 455/401 |
| 6,842,767 B1 * | 1/2005 | Partovi et al. | 709/203 |
| 7,068,643 B1 * | 6/2006 | Hammond | 370/352 |
| 2001/0024444 A1 * | 9/2001 | Asai | 370/401 |
| 2001/0030951 A1 * | 10/2001 | Kokot et al. | 370/329 |
| 2002/0034956 A1 * | 3/2002 | Mekuria | 455/466 |
| 2002/0035474 A1 * | 3/2002 | Alpdemir | 704/270 |
| 2002/0046035 A1 * | 4/2002 | Kitahara et al. | 704/277 |
| 2002/0054571 A1 * | 5/2002 | Falsafi | 370/252 |
| 2002/0057678 A1 * | 5/2002 | Jiang et al. | 370/353 |
| 2002/0077082 A1 * | 6/2002 | Cruickshank | 455/413 |
| 2002/0080008 A1 * | 6/2002 | Angus | 340/7.25 |
| 2002/0128845 A1 * | 9/2002 | Thomas et al. | 704/270.1 |
| 2002/0129129 A1 * | 9/2002 | Bloch et al. | 709/220 |
| 2004/0171396 A1 * | 9/2004 | Carey et al. | 455/466 |
| 2007/0043574 A1 * | 2/2007 | Coffman et al. | 704/275 |

* cited by examiner

SYSTEM AND METHOD FOR MINIMISING BANDWIDTH UTILISATION IN A WIRELESS INTERACTIVE VOICE RESPONSE SYSTEM

FIELD OF THE INVENTION

The present invention relates to a system, apparatus and method of delivering interactive voice response (IVR) service, or the like, across a network More specifically, the present invention relates to efficient use of bandwidth and/or related network resources while delivering IVR services.

BACKGROUND OF THE INVENTION

Interactive voice response systems have become popular among companies as a cost-effective way of serving their customers. As is known to those of skill in the art, an IVR system is a group of voice recordings organized into menu choices that users can select via voice recognition or the DTMF tones on their touch-tone phones. For example, clients could call up their bank and receive a prerecorded message. Clients could then be given the choice to "Press one for account information", "Press two for loan information", or "Press zero to speak with a service representative." IVR systems can direct customers to the appropriate information or client representative while reducing the staffing needs of the organization.

While IVR systems have reduced the operating costs of companies, IVR systems can still be costly to create, debug and implement. Many IVR systems work on expensive and proprietary systems. Complex menu selections can take a great deal of time to develop and debug. However, the emerging voice XML standard promises to decrease the cost of IVR systems. VoiceXML is a subset of the eXtended Markup Language (XML), a text-based markup language. VoiceXML is designed for creating audio dialogs that feature synthesized speech, digitized voice, recognition of spoken and DTMF key input, recording of spoken input, telephony, and mixed-initiative conversations.

A problem with IVR systems is that they are slow to transmit information. Users can wait for a considerable time listening to all of the options before they can make menu decisions. This delay is not only inconvenient for the customer on the phone, but can be costly for the company providing the IVR service and the telephone carrier, both of whom have to allocate hardware resources during the IVR session. As the call volume increases, so do the operating costs. The company providing the IVR service often requires expensive IVR equipment, large storage capacities for prerecorded messages, a pool of telephone lines to handle concurrent customers, and a telephone switch to transfer customers to the agents.

The telephone carrier also has to provide switching and capacity resources for the calls. As is known to those of skill in the art, IVR messages and customer responses are both traditionally carried on voice channels. Voice channels require large amounts of transmission bandwidth and have low tolerance to latency within the carrier's network. This bandwidth must be budgeted while the customer passively listens to the IVR message. These resource costs are particularly acute for the providers of wireless telecommunications service, where bandwidth is at a premium.

Some effort has been made to reduce the operating costs of an IVR system. For example, the European Telecommunications Standards Institute ("ETSI") is working on distributed speech recognition ("DSR"). DSR (ES 201 108) attempts to use a data channel to send a representation of the speech rather than the speech itself over a voice channel. Computer processing, which transforms the speech into data at one end and the data back into speech at the other, is distributed between the customer's hardware and the company's hardware. Yet DSR's primary function is to improve voice recognition accuracy, which does not directly address the problem of good utilization of bandwidth. Furthermore, the DSR project does not address any of the functionality of an IVR system beyond speech recognition.

It is therefore desired to have a system, apparatus and method to deliver interactive voice response services in a more efficient manner.

SUMMARY OF THE INVENTION

It is an object of the present invention to provide a novel system, apparatus and method of delivering interactive voice response services and the like which obviates or mitigates at least one of the above-identified disadvantages of the prior art.

In an aspect of the invention, there is provided an IVR system comprising an IVR service provider operable to output a voice message and receive a subscriber response corresponding to the voice message. The system also comprises a subscriber station operable to receive the voice message for presentation to a subscriber and output the subscriber response when received from the subscriber, and, a network interconnecting the service provider and the subscriber station. The network is operable to convert the voice message and/or the subscriber response into a data message representative thereof for carriage over at least a portion of the network. The data message is for conversion back into a respective original voice message and/or the subscriber response after carriage over the portion of the network.

The present invention provides a novel system, method and apparatus of delivering IVR services in a more efficient manner over a network. The system provides for the placement of a subscriber station local to the subscriber and a gateway protocol converter at the base station. The gateway protocol converter converts bandwidth-intensive audio messages into compact data messages, which upon transmission to the subscriber station are converted back into audio messages. By using data messages instead of audio messages over the network, bandwidth is saved on the network for other traffic. Another embodiment of the invention provides a method for transmitting subscriber responses as compact data messages.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
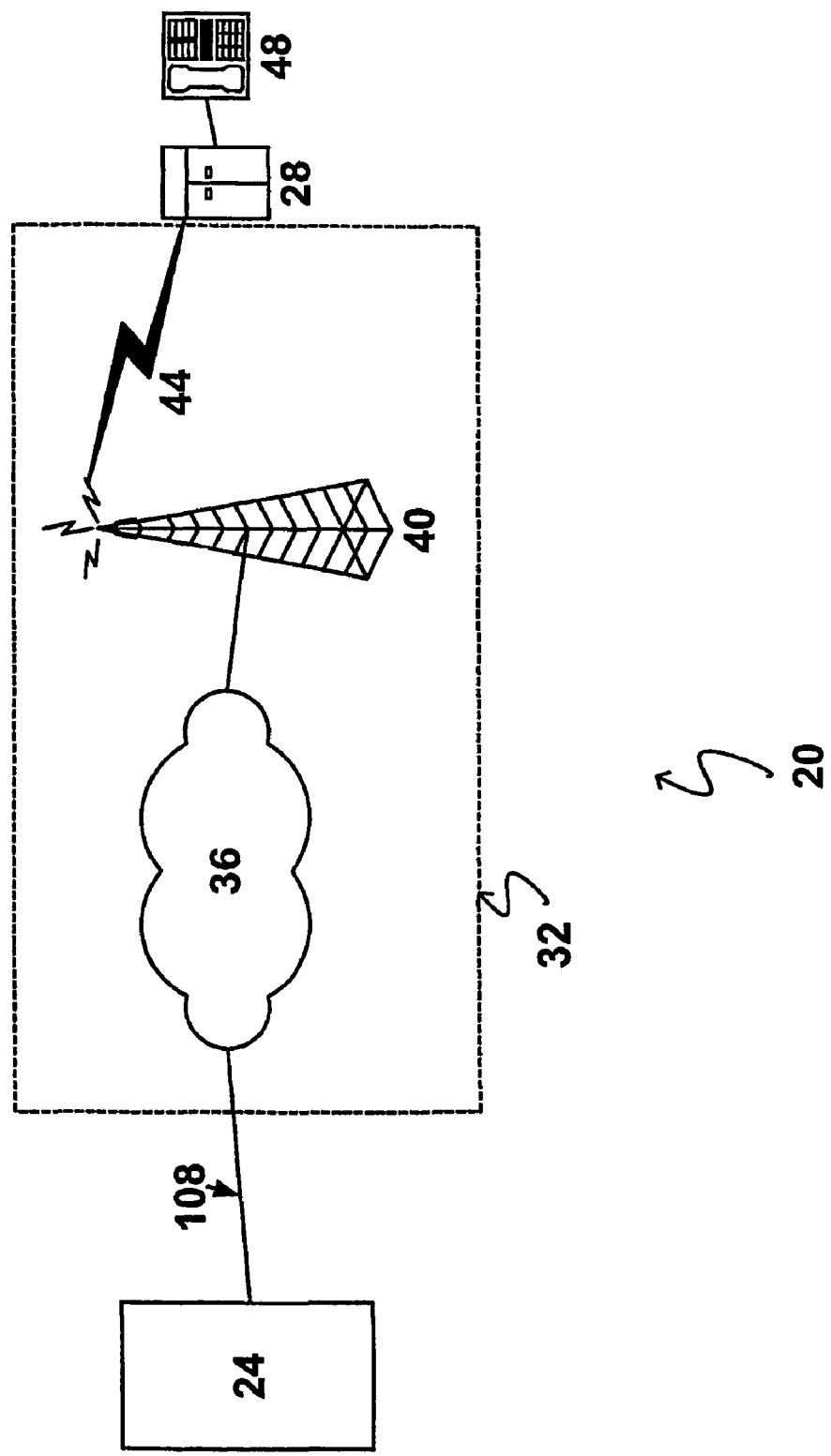
FIG. 1 shows a schematic representation of an IVR system in accordance with the present invention.

Referring now to FIG. 1, an IVR system, in accordance with an embodiment of the invention, is indicated generally at 20. IVR system 20 includes an IVR service provider 24 that is operable to output voice messages and receive responses from subscribers connected to IVR service provider 24. System 20 also includes a subscriber station 28 that is operable to receive voice messages generated by IVR service provider 24. Subscriber station 28 is also operable to present the voice messages to a subscriber using a POTS telephone 48 that connects to subscriber station 28. (In other embodiments, other types of voice terminals, other than POTS telephone 48 can be used, as desired.) System 20 also includes a network 32 that interconnects subscriber station 28 and IVR service provider 24. Network 32 is operable to carry the voice message and/or the subscriber responses as packet-switched text messages over at least a portion of network 32.

Figure 2:
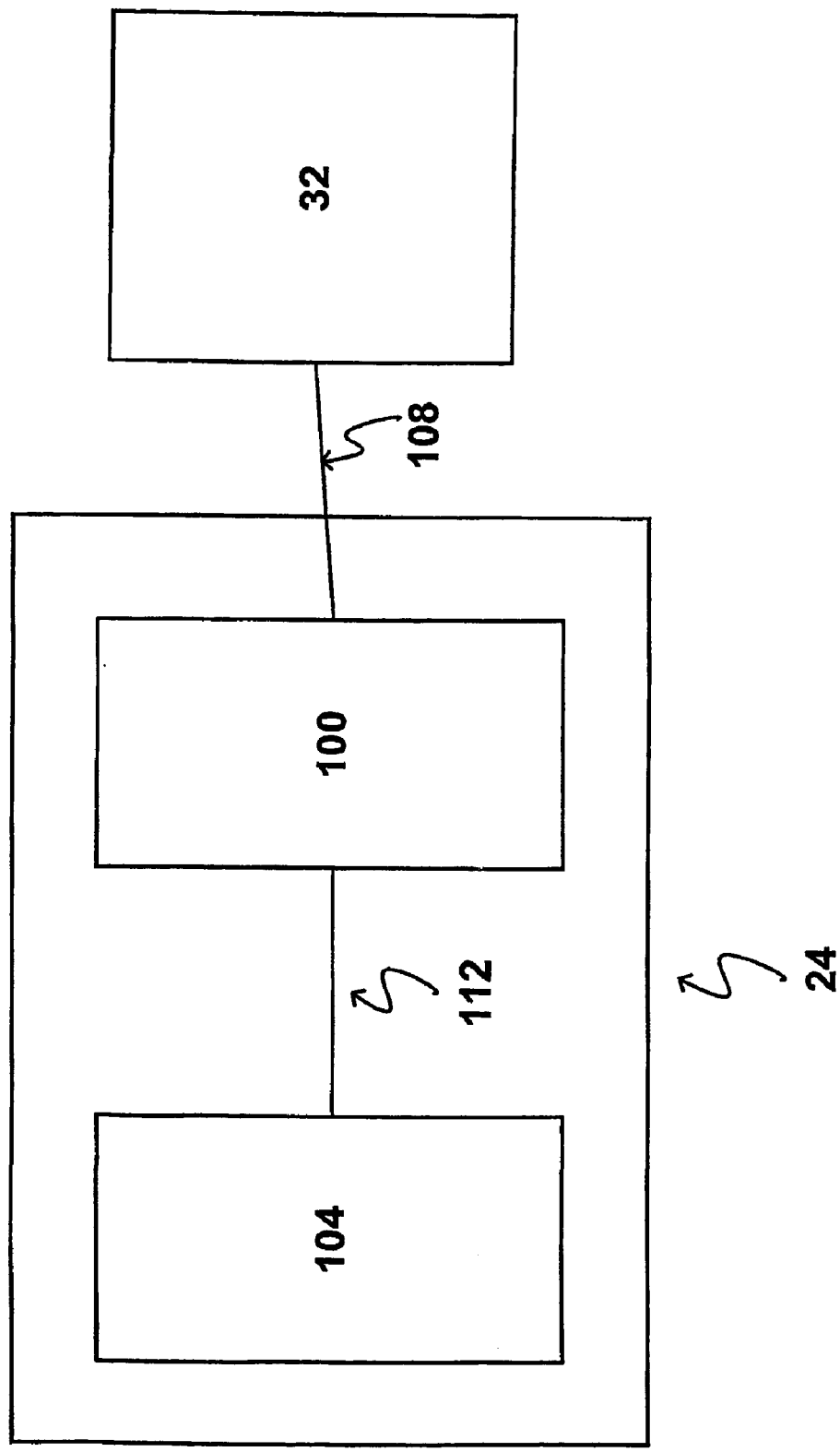
FIG. 2 shows a schematic representation of an IVR service provider in the system of FIG. 1.

Referring now to FIG. 2, IVR service provider 24 is described in greater detail. In the present embodiment, IVR service provider 24 consists of a switch 100 attached to network 32 (via any suitable connection, but referred to herein as connection 108) and to an IVR server 104. In the present embodiment, switch 100 is operable to accept one or more incoming circuit-switched calls from network 32 via connection 108. For example, connection 108 can actually be one or more DS-0 telephone lines, but it is to be understood that connection 108 can be any other link suitable for operation as a backhaul as will occur to those with skill in the art.

In the present embodiment, switch 100 is a telephony Centrex or PBX switch. An example of switch 100 would be a Meridian 1 PBX or DSM Centrex switch, both produced by Nortel Networks, Inc. (8200 Dixie Road, Suite 100 Brampton, Ontario L6T 5P6 Canada). Other types of switches 100 will occur to those with skill in the art. Switch 100 routes calls to IVR server 104 via connection 112. In the present embodiment, connection 112 is 100BasetT Ethernet cable, but could be any other sort of connection between switch 100 and IVR server 104.

IVR server 104 is operable to output voice messages and accept user inputs (also referred to herein as subscriber responses), which are typically in the form of dual tone multi-frequency (DTMF) tones. An example of IVR server 104 is the Symposium IVR, produced by Nortel Networks, Inc. In the present embodiment, IVR server 104 contains a data storage device that contains a number of prerecorded voice messages (not shown). Upon receiving DTMF inputs, IVR server 104 outputs one or more corresponding prerecorded voice message and/or cause the performance of switching functions, such as connecting the call to a customer service representative.

Referring again to FIG. 1, voice messages outputted from IVR service provider 24 are transmitted to subscriber station 28 via network 32. In the present embodiment, network 32 consists of a circuit-switched network 36 connected to a packet-switched base station 40. As is known to those of skill in the art, circuit-switched networks are networks that set up dedicated communication channels, typically using time-division multiplexing (TDM) technologies. An example of circuit-switched network 36 is the PSTN, but circuit-switched network 36 could also be a private, leased network, or other circuit-switched network.

Figure 3:
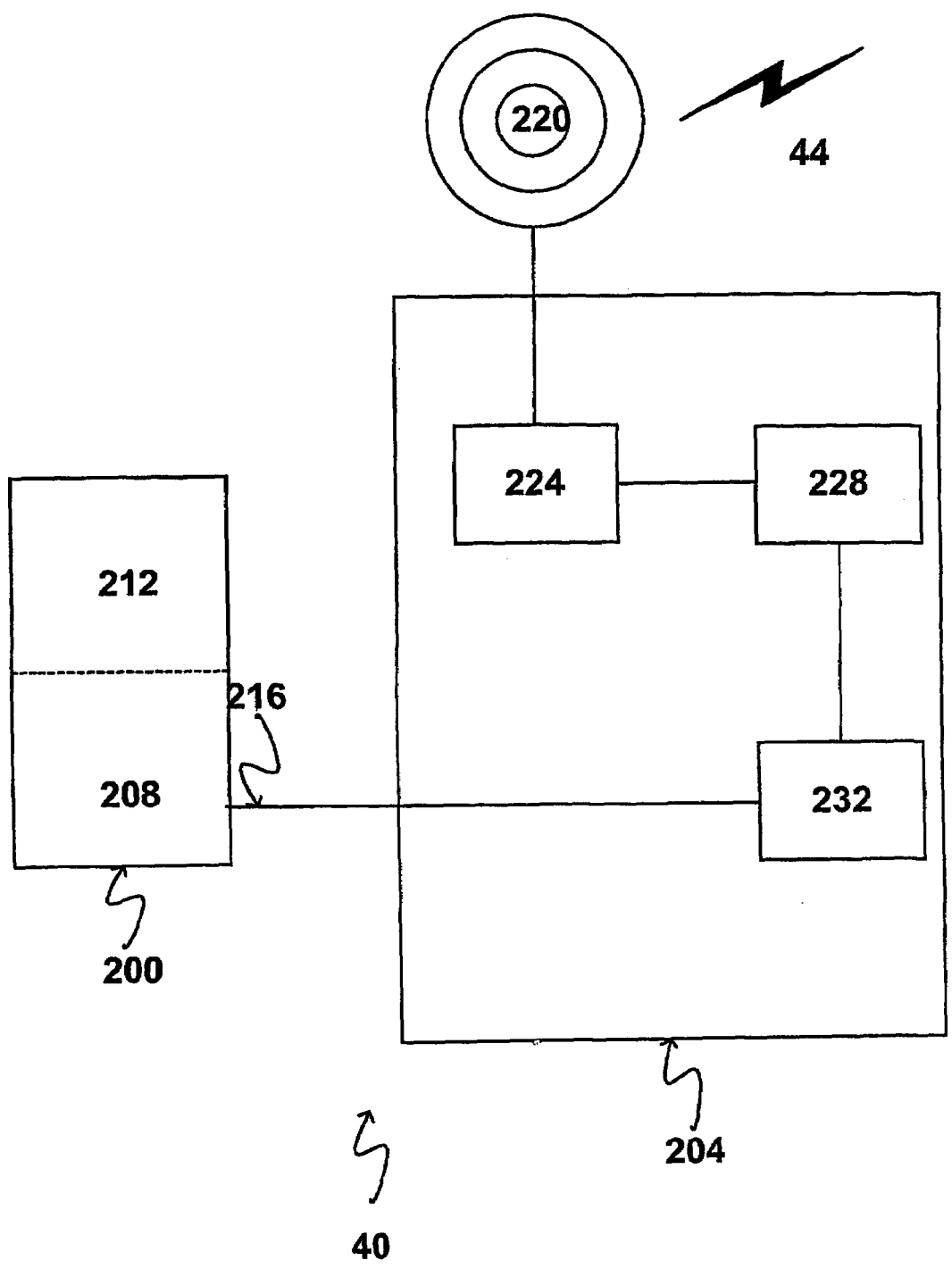
FIG. 3 shows a schematic representation of a base station in the system of FIG. 1.

Circuit-switched network 36 is connected to base station 40. Referring now to FIG. 3, base station 40 is shown in greater detail. In the present embodiment, base station 40 comprises a gateway protocol converter 200 and a transmitter 204. Utilizing appropriate software on microprocessor assembly 212 of converter 200, gateway protocol converter 200 is thus generally operable to translate circuit-switched voice messages from IVR service provider 24 into packet-switched text messages suitable for transmission over a data network or packet-switched network, such as the Internet. More specifically, speech-to-text software executes on microprocessor assembly 212 that is operable to produce text transcripts of the voice messages that originated from IVR service provider 24. (Gateway protocol converter 200 also includes a persistent storage device (not shown) for locally storing software or data as necessary to enable the transcription of voice messages.) Microprocessor assembly 212 is further operable to record the text transcription as ASCII text messages, and converted into a packet communication protocol suitable for transmission over wireless channel 44. The implementation/type of packet communication employed is not particularly limited, and can include IP (with TCP or UDP) and/or modifications thereof or any other packet implementation as will occur to those of skill in the art. One suitable microprocessor assembly 212 would be a SPARC processor system manufactured by SUN Microsystems.

In the present embodiment, speech-to-text converter 208 is a software program running on microprocessor assembly 212 (described below), but speech-to-text converter 208 could also be implemented as specialized DSP hardware or a combination of hardware and software.

Transmitter 204 is operable to receive the data packets from gateway protocol converter 200 via connection 216 and transmit the data packets over channel 44. In the present embodiment, connection 216 is 100BaseT Ethernet, but other connections will occur to those of skill in the art. Channel 44 allows information to be transferred between base station 40 and subscriber station 28 as needed. In the present embodiment, the radio-communication protocol employed for channel 44 is digitally based, such as GSM or CDMA. The implementation/type of packet communication employed is not particularly limited, and can include IP (with TCP or UDP) and/or modifications thereof or any other packet-switched implementation as will occur to those of skill in the art. In the present embodiment, channel 44 is divided into specialized sub channels, including, but not limited to, a voice channel and a data channel, both in the uplink and/or downlink directions. (An example of one suitable type of structure for channel 44 is discussed in copending application entitled "Communication Structure with Channels Configured Responsive to Reception Quality" and filed in the Canadian Patent Office on May 30, 2000, and assigned Application Number 2,310,188, the contents of which are incorporated herein by reference), The voice channel uses dedicated bandwidth to simulate the functionality of a circuit-switched telephone line. The data channel typically uses best-effort routing to transmit packet data whenever radio resources are available.

Transmitter 204 includes an antenna 220 for receiving and transmitting radio-communications over channel 44. In turn, antenna 220 is connected to a radio 224 and a modem 228.

Modem 228 is connected to a microprocessor-assembly 232. A suitable microprocessor assembly would be a SPARC processor system manufactured by SUN Microsystems. It will be understood that microprocessor assembly 232 can include multiple microprocessors, as desired.

Figure 4:
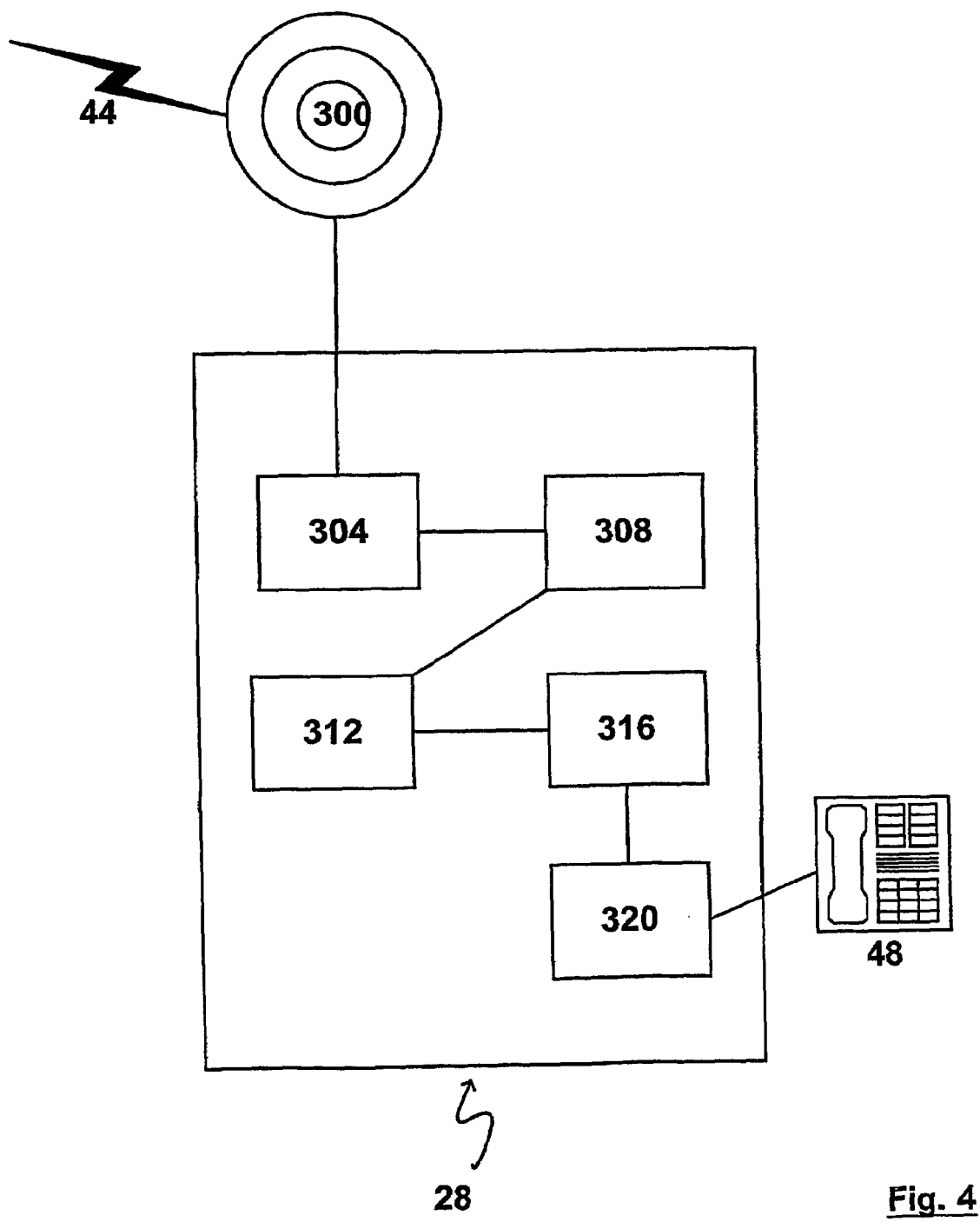
FIG. 4 shows a schematic representation of a subscriber station in the system of FIG. 1; and, FIG. 5 shows a method for delivering interactive voice response services in accordance with an embodiment of the invention.

Referring now to FIG. 4, subscriber station 28 is shown in greater detail. Subscriber station 28 comprises an antenna 300 for receiving and transmitting radio-communications over communication channel 44. In turn, antenna 300 is connected to a radio 304 and a modem 308, which in turn is connected to a microprocessor-assembly 312.

Microprocessor-assembly 312 which can include, for example, a StrongARM processor manufactured by Intel, performs a variety of functions, including implementing A/D-D/A conversion, voice codecs, filters, encoders, data compressors and/or decompressors, packet assembly/disassembly. Microprocessor-assembly 312 interconnects modem 308 and the port 320. Accordingly, microprocessor-assembly 312 is operable to process voice-telephone calls using telephone set 48 (connected to port 320) and through modem 308.

In the illustrated embodiment of the present invention, each subscriber station 28 provides at least one telephony port 320 such as a standard RJ-11 jack for a conventional telephone set 48. Subscriber station 28 also includes a text-to-speech converter 316 that is connected to microprocessor assembly 312 and is operable to convert ASCII text messages into voice signals. Text-to-speech converter 316 includes a persistent storage device (not shown) for locally storing software and data as necessary to enable the translation of text to voice. In the present embodiment, the translation of text to voice occurs by synthesizing speech based on the text transcript.

Figure 5:
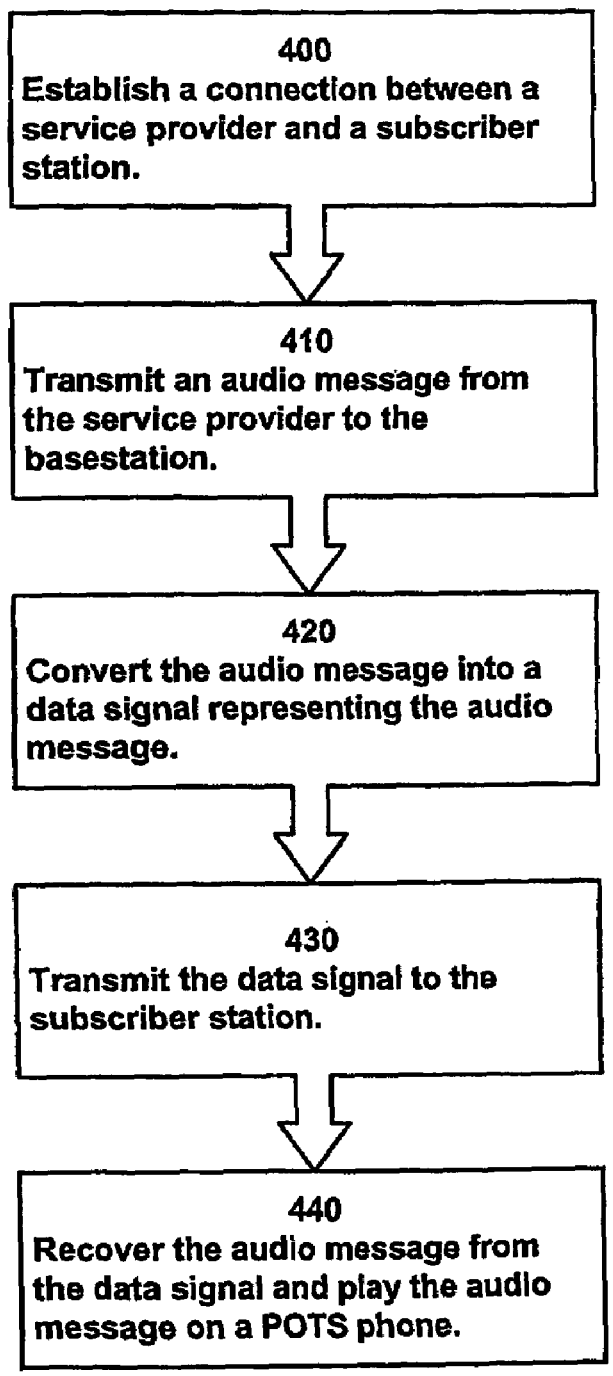

Referring now to FIG. 5, a method of playing an audio message to a subscriber is shown. For purposes of explaining the method, reference will be made to system 20 and FIGS. 1-4.

Beginning at step 400, a connection between a service provider 24 and a subscriber station 28 is established as follows. A subscriber completes a call to IVR service provider 24. The establishment of the connection can occur using any means known in the art. For example, the subscriber dials the phone number of IVR service provider 24 using POTS telephone 48. Subscriber station 28 transmits this request to setup a telephone call to base station 40 over the voice portion of communications channel 44. Base station 40 then routes the call along network 36 to switch 100 through connection 108. Switch 100 connects the call with IVR server 104. At this point, a circuit exists between POTS telephone 48 and IVR service provider 24. Other ways of completing the call will occur to those of skill in the art.

At step 410, IVR service provider 24 transmits an audio message. This transmission occurs by having switch 100 route the call to IVR server 104. IVR server then plays a prerecorded message across the circuit. The voice message can then be transmitted across network 36 where it is received by base station 40.

At step 420, the audio message is converted into a data signal representing the audio message. The call passes through gateway protocol converter 200. Within gateway protocol converter 200, speech-to-text converter 208 produces a text transcript of the audio message originating from IVR service provider 24. The transcript is written as ASCII text, and after the text message is produced, microprocessor-assembly 212 encapsulates the text message into IP packets. These IP packets are transmitted to transmitter 204 across connection 216.

At step 430, subscriber station 28 receives the data signals from base station 40. Transmitter 204 transmits the IP packets across the data portion of channel 44; and subscriber station 28 receives the IP packets on channel 44.

At step 440, the audio message is recovered from the data signal received at subscriber station 28 on channel 44. The IP packets are reassembled into the text message and then passed on to text-to-speech converter 316. Text-to-speech converter 316 generates a synthesized voice signal using text-to-speech software. This synthesized voice signal is then passed through telephone port 320 to the speaker of POTS telephone 48. The subscriber can hear the message initially produced by IVR server 24.

It is contemplated that the method of FIG. 5 can be varied and modified to accommodate different needs and requirements. For instance, instead of using prerecorded voice messages, IVR server 104 could be a computer which generates synthesized speech, or uses any other method of presenting voice messages. IVR server 104 could also be connected to an automatic calling distributor (ACD), voice mail system, or computer-telephone integration (CTI) system as is known to those with skill in the art.

It is also contemplated that network 36 could have different structures that are within the scope of the invention. For instance, in the embodiment discussed here, network 36 is a circuit-switched network. While circuit-switched network 36 carries voice messages on dedicated circuits, signaling for the network can be done using out-of-band packet-switched technologies such as SS7. If IVR service provider 24 uses data messages, rather than audio messages, then in another embodiment of the invention, network 36 could be substituted with a packet-switched network such as the Internet.

It is further contemplated that voice-to-text conversion could occur at IVR service provider 24, rather than at base station 40. In this case, the gateway-protocol converter 200 would reside at IVR service provider 24. In this case, network 36 would be a packet-switched network and base station 40 would consist only of transmitter 204.

It is further contemplated that different gateway protocol converter 200 could use different techniques to convert audio messages to data messages. Instead of transcribing the audio message to ASCII text, gateway protocol converter 200 could use, for example: an audio compression scheme (such as MP3); transcriptions of the voice message using a markup language format such as voiceXML; or information pointing to a prerecorded message already available at subscriber station 28.

It is further contemplated that IVR service provider 24 could locally generate data or text messages, rather than audio messages. In this scenario, there would be no need for gateway-protocol converter 200, and the text or data messages would be transmitted over a packet-switched network (instead of a circuit-switched network) directly to base station 40.

Furthermore, it will be understood that system 20 can have additional base stations 40, as desired, where subscriber station 28 is within range of two or more base stations 40, and that communications between multiple base stations 40 and subscriber stations 28 can be managed using known soft-handoff techniques. Other known wireless architectures can be employed. For example, base station 40 can be multi-sectored, each sector being defined by directional antennas, each sector comprising a different reception footprint and thus allowing reuse of available spectrum between sectors serviced from a single base station 40.

While the present embodiment is directed to digitally-based radio communications, it will be understood that the present invention can be suitably modified to accommodate an analog based radio communications channel, such as that found in analog cellular telephone networks. It is also to be understood that channel 44 could be a landline communications channel, such as an xDSL line, ISDN line, or coaxial cable line. In this case, base station 40 would be modified accordingly to transmit across the new communication channel.

It is to be understood that additional telephony ports for facsimile and/or data can be provided in each subscriber station 28 if desired. The provided data port can be an Ethernet port, or any other suitable connector/port for interfacing with a computer or other information appliance to a data network available via an appropriate backhaul.

Figure 6:
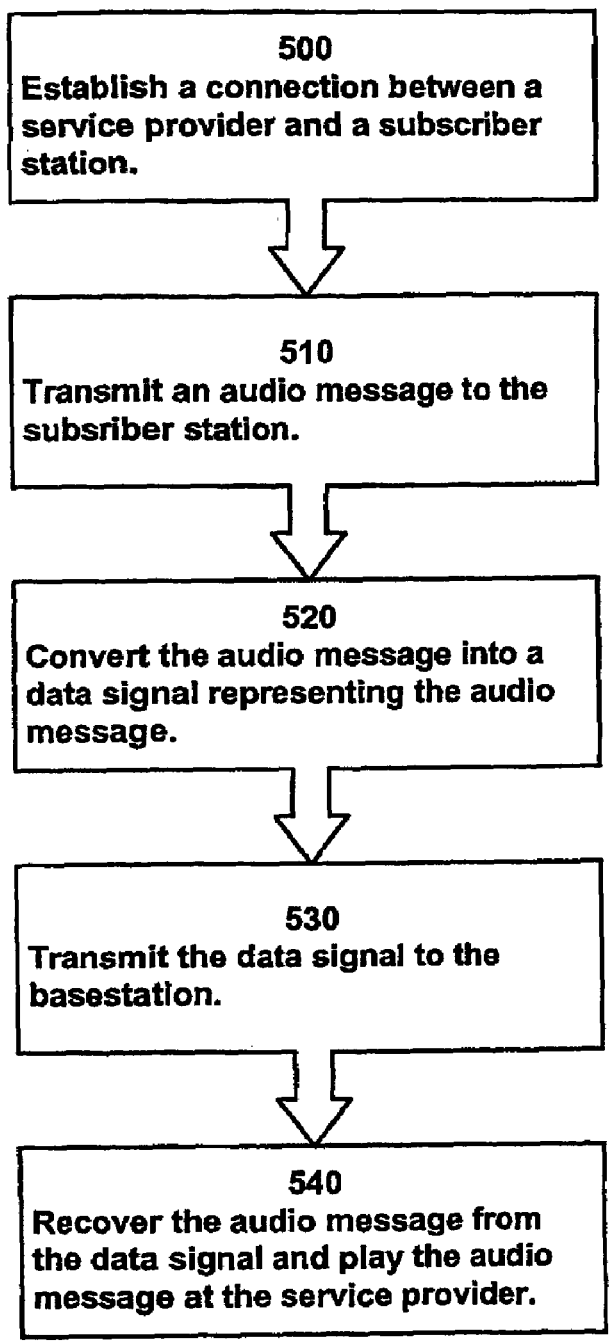
FIG. 6 shows a method for delivering interactive voice responses in accordance with another embodiment of the invention; and, FIG. 7 shows a schematic representation of an IVR system in accordance with another embodiment of the present invention.

In FIG. 6, a method for sending a response message to a service provider is shown in accordance with another embodiment of the invention. For purposes of explaining the method, reference will be made to system 20 and FIGS. 1-4.

Beginning at step 500, a connection between a service provider 24 and a subscriber station 28 is established. The establishment of the connection can occur using any means known in the art. For example, the subscriber dials the phone number of IVR service provider 24 using POTS telephone 48. Subscriber station 28 transmits this request to setup a telephone call to base station 40 over the voice portion of channel 44. Base station 40 then routes the call along network 36 to switch 100 through connection 108. Switch 100 connects the call with IVR server 104. At this point, a circuit exists between POTS telephone 48 and IVR service provider 24. Other ways of completing the call will occur to those of skill in the art.

(Step 500 may have, in fact, already been established well before the subscriber decides to send a message to the service provider. For example, the subscriber could have already received a message from IVR service provider 24 using the method described in FIG. 5. In this case, the connection is already established.)

At step 510, the subscriber produces a response message on his or her POTS telephone 48. An example of a response message is an audio message in the form of a DTMF tone created by depressing the appropriate keys on the touch-tone keypad of telephone 48. The audio message is then transmitted from phone 48 to subscriber station 28.

At step 520, the audio message is converted into a data signal representing the audio message. An example of a data signal representing the audio message would be an ASCII number representing the DTMF tone, or using a protocol that inherently includes the ability to represent DTMF tones in a relatively small data package, such as that prescribed in the Real Time Protocol ("RTP"). Since there are only sixteen standard DTMF tones, it will be appreciated that the data signal could occupy only a few bits. Within subscriber station 28, microprocessor-assembly 312 encapsulates the message into the data signal in the form of IP packets.

At step 530, the IP packets are transmitted from subscriber station 28 to base station 40. Subscriber station 28 transmits the IP packets across the data portion of channel 44. In a present embodiment, transmission occurs as a data packet using the protocols of wideband CDMA, but other protocols will occur to those of skill in the art. Base station 40 receives the IP packets across channel 44.

At step 540, the audio message is recovered from the IP packets and played at the IVR service provider 24. Within base station 40, the IP packets are passed onto gateway protocol converter 200. Gateway protocol converter 200 converts the IP packets into an audio message suitable for transmission on circuit switched network 36. For example, the DTMF tone is regenerated, based upon the ASCII number sent in the IP packets. The audio message is then transmitted across network 36 to IVR service provider 24. IVR service provider 24 receives the audio message and can then process it in the usual manner.

It is contemplated that the method of FIG. 6 can be varied and modified to accommodate different needs and requirements. For instance, IVR server 104 could have voice recognition capabilities. In this case, the response message transmitted at step 500 could be a short voice message from the subscriber that is compressed (for example, in MP3 format) at subscriber station 28 and transmitted to base station 40, where it is decompressed for playback to IVR server 104. Alternatively, subscriber station 28 could include voice recognition capabilities, whereby subscriber station 28 converts the voice message from the subscriber directly into a data signal prior to transmission over channel 44.

It will be understood that system 20 can have additional base stations 40, as desired, where subscriber station 28 are within range of two or more base stations 40, and that communications between multiple base stations 40 and subscriber stations 28 can be managed using known soft-handoff techniques. Other known wireless architectures can be employed. For example, base station 40 can be multi-sectored, each sector being defined by directional antennas, each sector comprising a different reception footprint and thus allowing reuse of available spectrum between sectors serviced from a single base station 40.

It will be understood that the methods of FIG. 5 and FIG. 6 can be combined into a single system, in order to allow for efficient bi-directional use of bandwidth over channel 44.

It is to be understood that additional telephony ports for facsimile and/or data can be provided in each subscriber station 28 if desired. The provided data port can be an Ethernet port, or any other suitable connector/port for interfacing with a computer or other information appliance to a data network available via an appropriate backhaul.

It is to be understood that, in certain IVR systems, further efficiencies in bandwidth utilization of channel 44 can be achieved by transmitting an entire IVR tree of messages and possible responses to subscriber station 28 either upon connecting, or during the connection, of subscriber station 28 with IVR service provider 24. For example, where IVR service provider 24 has a tree of messages and accompanying responses, such as "Press 1 for English, Press 2 for French", and where there are a number of corresponding messages and allowable responses based on whether a subscriber selects 1 or 2, then this entire tree could be immediately downloaded to subscriber station 28 upon connection with service provider 24. Channel 44 could then be collapsed, and freed up for usage by others, while the subscriber at subscriber station 28 works his or her way through the entire tree and enters a complete set of responses to the audio messages. Once this complete set of responses is gathered at subscriber station 28, channel 44 could then be reopened and the responses sent thereover to IVR service provider 24. In this variation, it will now be appreciated by those of skill in the art that base station 40 and IVR service provider 24 would include additional equipment and functionality in order to maintain subscriber station's 28 place within IVR server 104.

It will be further appreciated that the all or part of the IVR tree could be downloaded in one or more languages, depending on the preferences of the subscriber at subscriber station 28. Alternatively, or in addition, the data message representation of the audio messages from IVR service provider 24 could be transmitted over channel 44 in a universal language format, that could then be converted into the subscriber's preferred language for playback at POTS telephone 48 by software executing in subscriber station 28.

Another embodiment of the invention will now be discussed with reference to FIG. 7, which shows an IVR system 20*a*. System 20*a* is comprised of an IVR service provider 24*a* that includes server equipment (such as a Windows NT server or SUN SPARC server) operable to act as a VoiceXML Document Server for hosting VoiceXML documents (or the like). IVR service provider 24*a* is connected via a backhaul 108*a* to a communication network 32*a*. Network 32*a* is also connected to a subscriber station 28*a* that is operable to provide voice services over network 32*a* to a subscriber using a conventional POTS telephone 48*a* attached thereto.

In the present embodiment, communication network 32*a* is comprised of the Internet 36*a* (or any other packet switched network), and a wireless base station 40*a*. IVR service provider 24*a* and subscriber station 28*a* each have an IP address (or other appropriate type of network address) within communication network 32*a*. Subscriber station 28*a* accesses the Internet 36*a* over a wireless channel 44*a* and through wireless base station 40*a*, which also has its own IP address (or the like) within communication network 32*a*. In the present embodiment, channel 44*a* is substantially identical to channel 44 discussed above and with reference to system 20 of FIG. 1, but any suitable channel structure can be used.

The VoiceXML documents hosted at IVR service provider 24*a* are accessible through network 32*a* using service provider 24*a*'s IP address. Thus, subscriber station 28*a* is operable to utilize the IP address of service provider 24*a* in order to access the VoiceXML documents at IVR service provider 24*a* through base station 40*a* and via network 32*a*. Base station 40 further includes a VoiceXML Interpreter Context that maintains a VoiceXML Interpreter, which is operable to interpret the VoiceXML documents retrieved from for VoiceXML Document Server (resident at IVR service provider 24*a*) into a format usable by a VoiceXML Interpreter that is resident at subscriber station 28*a*, and to transmit those interpreted VoiceXML documents over channel 44*a* to subscriber station 28*a*. By the same token, subscriber station 28*a* includes a VoiceXML Interpreter Platform which is operable to render the interpreted VoiceXML messages received over channel 44*a* into an audio message (using any suitable method, such as a text-to-speech engine or a using a cache of audio files) which is playable from the earpiece or speaker of POTS telephone 48*a*.

It will be understood that, in the present embodiment, VoiceXML Interpreter Context is resident at base station 40*a* so that the relatively low-bandwidth interpreted VoiceXML documents can be sent over channel 44*a*, thereby using channel 44*a* in a more efficient manner than sending voice messages over channel 44*a*. By the same token, the VoiceXML Implementation Platform is resident at subscriber station 28*a* in order to allow the interpreted VoiceXML documents to be rendered into a playable audio message (which should otherwise occupy more bandwidth of channel 44*a* than the interpreted VoiceXML documents), thus presenting the subscriber at POTS telephone 48 with an IVR voice message in a manner transparent to the subscriber, while efficiently utilizing channel 44*a*.

It will now be apparent to those of skill in the art that:

the VoiceXML Document Server hosting VoiceXML documents resident at IVR service provider 24*a*;

the VoiceXML Interpreter Context resident at base station 40*a*; and, the VoiceXML Platform resident at subscriber station 28*a*, are substantially identical to the VoiceXML Document Server, VoiceXML Interpreter, and Implementation Platform, respectively, as described in "Voice extensible Markup Language—VoiceXML", Version 1.00, Mar. 7, 2000, © 2000 VoiceXML Forum ("VoiceXML Standard"), the contents of which are incorporated herein by reference. In particular, Section 2.1 under the heading "Architectural Model" describes an architectural model for a VoiceXML system that includes a Document Server, a VoiceXML Interpreter Context and a VoiceXML Implementation Platform. In contrast to the VoiceXML system described in the VoiceXML Standard, however, in the present present embodiment of the invention these components are not collectively housed at an IVR service provider, but are distributed along the entire link spanning subscriber station 28*a*, communication network 32*a*, and service provider 24*a*.

Figure 7:
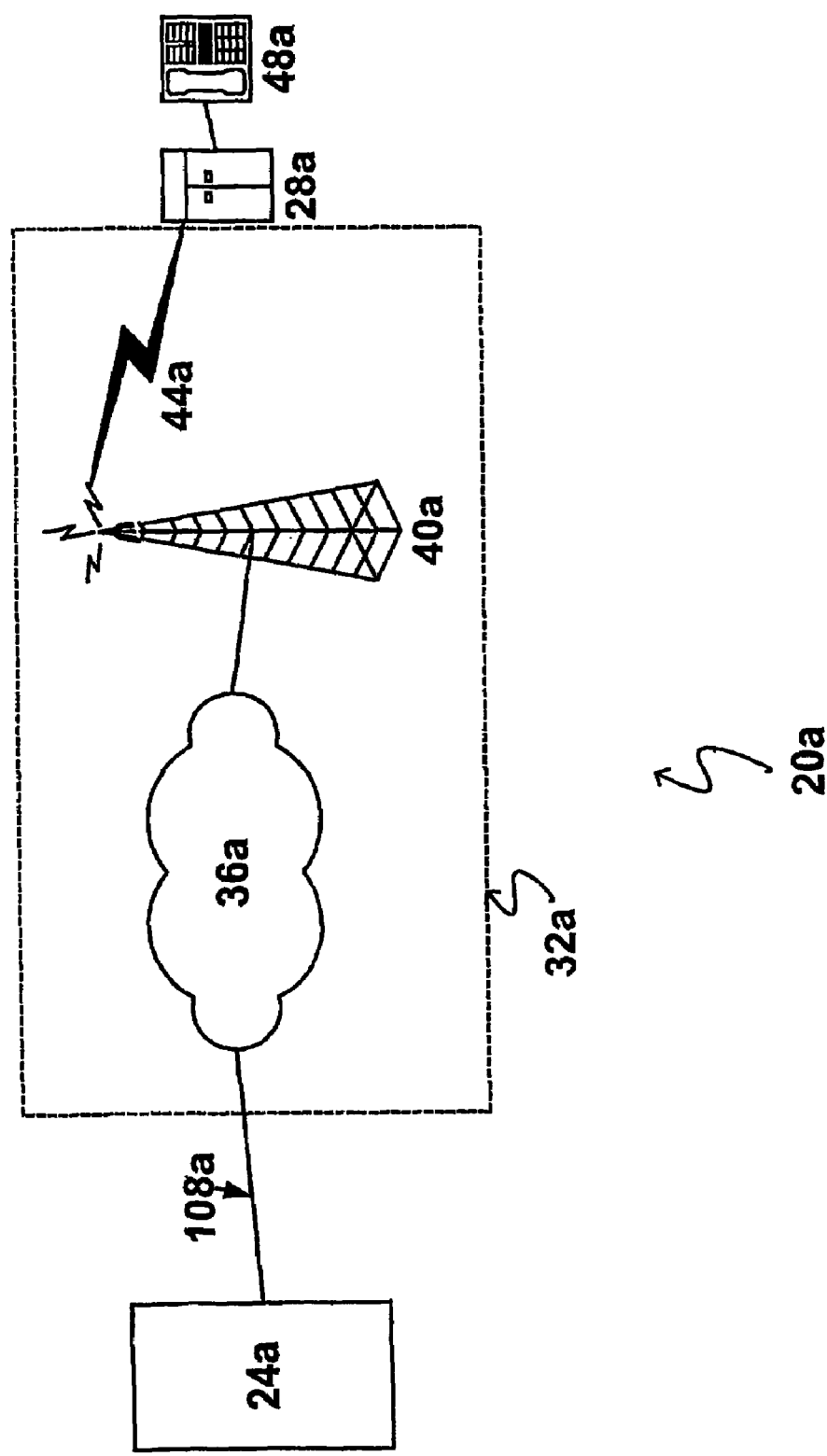

By the same token, those of skill in the art will recognize that subscriber responses can also be sent from subscriber station 28*a* to IVR service provider 24*a* by utilizing the components of FIG. 7 according to the teachings of the VoiceXML Standard, except that the responses are generated and processed in the distributed manner described along system 20*a*. It is to be understood that this variation is also within the scope of the invention.

In general the present invention contemplates the distribution of the components described in the VoiceXML Standard along an entire communication link between a subscriber station 28*a* and an IVR service provider 24*a* according to a desired utilization of resources along that link. Resources can include, for example, the bandwidth available on backhaul 108*a* and/or channel 44, and/or the CPU resources of subscriber station 28*a*. The desired utilization can be according to the efficient utilization of such resources. For example, in the embodiment shown in FIG. 7, the efficient use of channel 44 is achieved by locating the VoiceXML Implementation Platform at subscriber station 28*a*, and locating the VoiceXML Interpreter Context and the VoiceXML Document Server on the side of channel 44 opposite from subscriber station 28*a*.

As an alternative to the embodiment shown in FIG. 7, however, where sufficient hardware resources (i.e. CPU, random access memory, and/or hard disk storage) are located at subscriber station 28*a*, then it may be desired to also locate the VoiceXML Interpreter Context at subscriber station 28*a* in addition to locating the VoiceXML Implementation Platform at subscriber station 28*a*.

As still a further alternative to the embodiment show in FIG. 7, both the VoiceXML Document Server and the VoiceXML Interpreter Context can be resident at WVR Service Provider 24*a* while the VoiceXML Implementation Platform is located at subscriber station 28*a*, and thus the interpreted VoiceXML documents are sent through the entire communication network 32*a* to subscriber station 28*a*. Other distributions of VoiceXML Document Server, VoiceXML Interpreter Context and VoiceXML Implementation Platform will now occur to those of skill in the art.

While the embodiments discussed herein refer to the transmission of IVR voice messages and/or subscriber responses (either DTMF or voice) as a data representation thereof over wireless channel 44, it is to be understood that the present invention can be applied to other communication media, in addition to or in lieu of wireless channel 44, where bandwith and/or other communication resources are limited and thus desired to transmit IVR audio messages and/or subscriber responses as data representations or in some other suitable compressed format.

It is to be understood that the various embodiments discussed herein, and the particular aspects thereof, can have subsets, be varied and/or combined in order to provide different IVR systems, as desired, and that such subsets, variations and combinations are within the scope of the invention.

The present invention provides a novel system, method and apparatus of delivering interactive voice response services in a more efficient manner over a network. In one embodiment of the invention the system provides a subscriber station local to the subscriber and a gateway protocol converter at the base station. The gateway protocol converter converts bandwidth-intensive audio messages from an IVR service provider into compact data messages representative of the audio messages, which upon transmission to the subscriber station are converted back into the original audio message. By using data messages instead of audio messages over the network, bandwidth is used more efficiently since the network does not need to maintain a dedicated voice channel between the base station and the subscriber station and the data message can be more compact than the equivalent audio message. Another embodiment of the invention provides a method for transmitting subscriber responses utilizing the system. By converting subscriber responses into data signals, bandwidth is used more efficiently since the network does not need to maintain a dedicated voice channel between the subscriber station and the base station, the subscriber response can be briefly delayed during heavy network traffic, and the data message can be more compact than the equivalent audio message. Still further embodiments of the invention teach the distribution of the components of a VoiceXML system, or the like, according to the VoiceXML Standard in a manner that provides an efficient and/or otherwise desired utilization of communication and/or hardware resources.

The above-described embodiments of the invention are intended to be examples of the present invention and alterations and modifications may be effected thereto, by those of skill in the art, without departing from the scope of the invention which is defined solely by the claims appended hereto.

We claim:

1. An IVR system comprising:
    an IVR service provider operable in response to a call placed from a subscriber station to output a voice message and receive an audio response corresponding to said voice message;
    a wireless base station connected to said IVR service provider via a circuit-switched telephone network, said wireless base station having a protocol converter for converting said voice message into a first packet-switched text message, said wireless base station further having a first transceiver for transmitting said first packet-switched text message over a wireless packet-switched channel; and,
    said subscriber station having a second transceiver operable to receive said first packet-switched text message over said wireless packet-switched channel and convert said first packet-switched text message back into said voice message and to convert said audio response into a second packet-switched text message and transmit said second packet-switched text message over said wireless packet-switched channel, said wireless base station being further operable to convert said second packet-switched text message back into said audio response and transmit said audio response back to said IVR service provider via said circuit-switched telephone network.

2. The IVR system according to claim 1 wherein said audio response is a DTMF tone.

3. The IVR system according to claim 1 wherein said audio response is a voice response.

4. An IVR system comprising:
    an IVR service provider operable to output a voice message and receive a subscriber response corresponding to said voice message;
    a subscriber station operable to receive said voice message for presentation to a subscriber and output said subscriber response when received from said subscriber; and,
    a network interconnecting said IVR service provider and said subscriber station, said network operable to convert said voice message and said subscriber response into a packet-switched text messages for carriage over a packet-switched portion of said network, said packet-switched text message for conversion back into a respective said voice message or said subscriber response, as the case may be, for carriage over a circuit-switched portion of said network after carriage over said packet-switched portion, wherein said network comprises a wireless base station connected to said IVR service provider by a wired link and said packet-switched portion is a wireless channel interconnecting said wireless base station and said subscriber station, and wherein said packet-switched text message is a VoiceXML representation of said voice message that is generated by a gateway protocol converter resident at said base station and said packet-switched text message is converted back into said voice message by a text-to-speech convertor resident at said subscriber.

5. The IVR system according to claim 4 wherein said packet-switched text message occupies less bandwidth over said wireless channel than would otherwise be occupied by said voice message or said subscriber response, as the case may be.

6. An IVR system comprising:
    an IVR service provider operable to output a voice message and receive a subscriber response corresponding to said voice message;
    a subscriber station operable to receive said voice message for presentation to a subscriber and output said subscriber response when received from said subscriber; and,
    a network interconnecting said IVR service provider and said subscriber station, said network operable to convert said voice message and said subscriber response into a packet-switched text messages for carriage over a packet-switched portion of said network, said packet-switched text message for conversion back into a respective said voice message or said subscriber response, as the case may be, for carriage over a circuit-switched portion of said network after carriage over said packet-switched portion, wherein said network comprises a wireless base station connected to said IVR service provider by a wired link and said packet-switched portion is a wireless channel interconnecting said wireless base station and said subscriber station, and wherein said subscriber response is a DTMF tone and said packet-switched text message is an ASCII number representing said DTMF tone that is generated by a microprocessor resident at said subscriber station and said packet-switched text message is converted back into said DTMF tone by a microprocessor resident at said base station.

7. A method of playing a voice message from IVR service provider at a subscriber station and sending a subscriber response from said subscriber station to said IVR service provider, comprising the steps of:

establishing a connection through a network that interconnects said IVR service provider and said subscriber station, said network comprising at least a circuit-switched portion connecting to said IVR service provider and a packet-switched portion connecting to said subscriber station;

transmitting said voice message from said IVR service provider;

converting said voice message into a first packet-switched text message representing said voice message for transmission over said packet-switched portion;

receiving said first packet-switched text message at said subscriber station;

recovering said voice message from said first packet-switched text message and playing said voice message at said subscriber station;

converting said subscriber response into a second packet-switched text message representing said subscriber response;

transmitting said second packet-switched text message from said subscriber station over said packet-switched portion;

converting said second packet-switched text message into a audio response representing said second packet-switched text message for transmission over said circuit-switched portion;

receiving said audio response at said IVR service provider.

8. The method according to claim 7 wherein said first packet-switched text message is a text transcription of said voice message.

9. The method according to claim 7, wherein said subscriber response is a DTMF tone and said second packet-switched text message is an ASCII number representing said DTMF tone.

10. The IVR system according to claim 3 wherein said second packet-switched text message is a text transcription of said voice response.

11. The IVR system according to claim 2 wherein said second packet-switched text message is an ASCII number representing said DTMF tone.

12. The IVR system according to claim 1 wherein said first packet-switched text message is a text transcription of said voice message.

* * * * *